Figure 1:
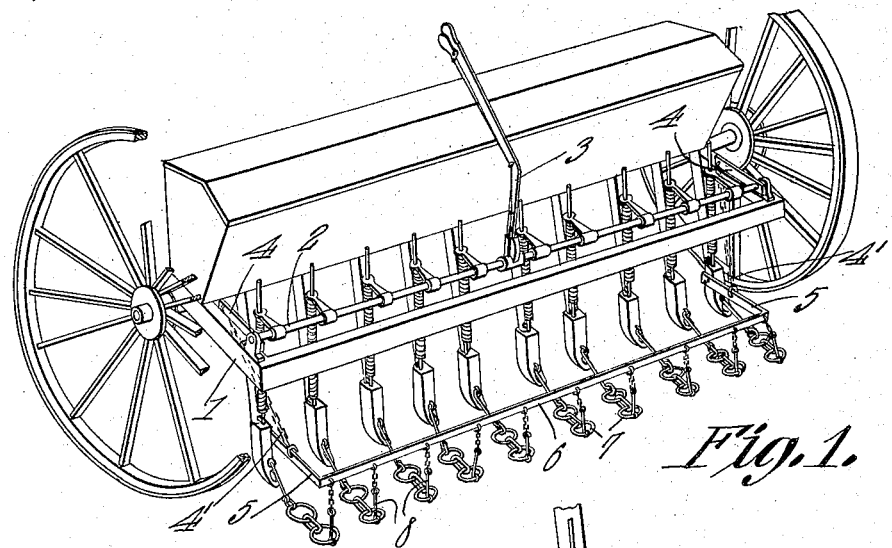

G. H. SAMLOW.
CHAIN COVERER FOR DRILLS.
APPLICATION FILED NOV. 7, 1914.

1,166,718.

Patented Jan. 4, 1916.

G. H. Samlow,
Inventor

Witnesses by
Attorneys

UNITED STATES PATENT OFFICE.

GEORGE H. SAMLOW, OF NAPOLEON, OHIO.

CHAIN COVERER FOR DRILLS.

1,166,718.   Specification of Letters Patent.   Patented Jan. 4, 1916.

Application filed November 7, 1914. Serial No. 870,819.

*To all whom it may concern:*

Be it known that I, GEORGE H. SAMLOW, a citizen of the United States, residing at Napoleon, in the county of Henry and State of Ohio, have invented a new and useful Chain Coverer for Drills, of which the following is a specification.

The present invention relates to improvements in chain coverers for drills, one object of the invention, being the provision of means whereby the chain coverers of a drill may be elevated entirely from contact with the ground so that the drill may be turned or may be backed without the chains dragging upon the ground, and also whereby the chains may be lowered upon the ground when the drill is being moved forwardly in the proper drilling operation.

A further object of the present invention is the provision of a simple mechanism, by means of which the chain coverers are properly moved to and from the ground and by means of which the present device may be readily applied to the many forms of grain drills now in use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings:—

Figure 2:
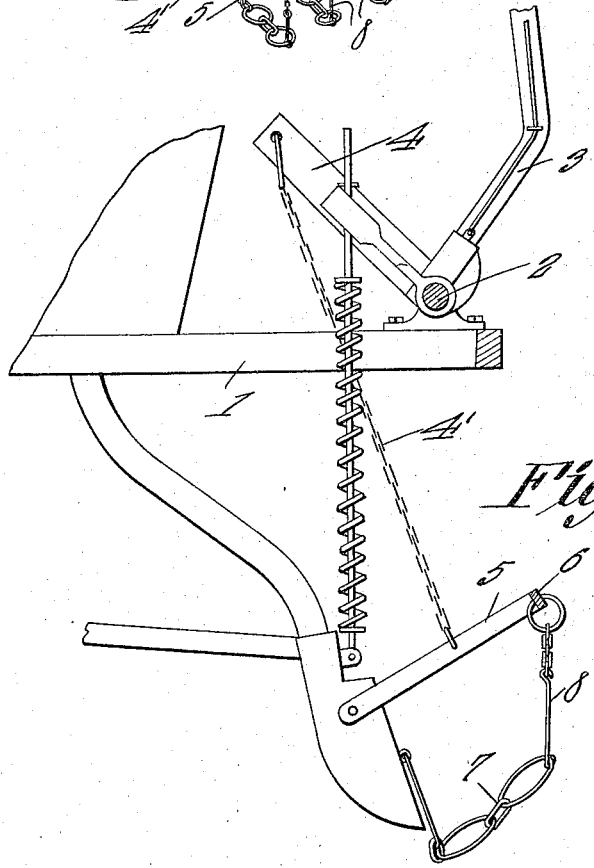

Figure 1 is a rear perspective view of a drill showing the present invention applied thereto, the chain coverers being in their lowermost positions. Fig. 2 is a view showing the chain coverers elevated, the adjacent portion of the drill being shown.

Referring to the drawings, the numeral 1 designates the frame of the drill, which has mounted thereon in this instance, the oscillatory manually controlled shaft 2 operated by the usual lever 3. Attached to the opposite ends of the shaft are the two arms 4, which have connected to the free ends thereof, the respective chains 4'. These chains 4' are connected to the short legs 5 of the U-shaped frame 6, which is extended transversely of and mounted for swinging movement at the rear of the drill. This frame 6 is pivotally connected to the drill, so that the same may be moved to and from the ground.

The chain coverers 7 are attached at their forward ends as is the usual practice, while their rear ends are attached by means of the flexible connections 8 at equi-distant points to the frame 6. In this manner, when the frame 6 is raised or lowered in the respective positions as shown, the chain coverers are moved away from the ground or upon the ground.

It will thus be seen that with this construction, that all of the chain coverers are either lowered simultaneously or raised simultaneously, and that therefore, when raised, the drill may be backed or turned without the chain coverers dragging upon the ground and interfering with the passage of the drill mechanism.

The present device may be readily attached to the many forms of drills, it being then necessary that the frame 6 be properly positioned and attached to the rear ends of the chain coverers so that the same may be actuated either by the shaft herein illustrated or by the usual forms of shafts upon drills. The same may be either at the front or rear, the peculiar connection thereof being changed according to the location of such operating shaft.

What is claimed is:

1. The combination with a drill, and a plurality of chain coverers therefor, of manually controlled means connected to all of the chain coverers and attached to the drill for raising and lowering the chain coverers to and upon the ground, said latter means including a rearwardly extending frame swingingly attached to the rear of the drill and overhanging the coverers, a plurality of attaching means carried thereby and engaging the rear ends of the chain coverers, and manually controlled means carried by the drill and connected to the frame for swinging the frame to and from the ground to cause the consequent raising or lowering of the chain coverers.

2. The combination with a drill and a plurality of chain coverers, of means for raising and lowering the chain coverers, including a U-shaped frame having its terminals swingingly attached to the drill, said frame being extended rearwardly of the frame for movement to and from the ground, a plurality of flexible connections disposed equidistantly upon the frame and attached to the respective chain coverers, two flexible connections connected to the sides of the frame and extended upwardly to the drill, and a manually controlled oscillatory shaft journaled in the drill and attached to the last named flexible connections.

In testimony that I claim the foregoing as my own, I have hereto affixed my signature in the presence of two witnesses.

GEORGE H. SAMLOW.

Witnesses:
 DENNIS D. DONOVAN,
 LIZZIE ZIEROLF.

Copies of this patent may be obtained for five cents each, by addressing the "Commissioner of Patents, Washington, D. C."